United States Patent [19]
Fejes

[11] Patent Number: 5,494,725
[45] Date of Patent: Feb. 27, 1996

[54] LOAD BEARING PAD

[75] Inventor: Mark Fejes, Seattle, Wash.

[73] Assignee: Nippon Steel Corporation, Tokyo, Japan

[21] Appl. No.: 97,552

[22] Filed: Jul. 26, 1993

[51] Int. Cl.$^6$ .................. A47C 27/00; A61H 7/00
[52] U.S. Cl. .................. 428/120; 5/420; 5/448;
5/461; 5/481; 5/900.5; 5/901; 5/902; 297/452.39;
297/DIG. 1; 297/DIG. 2; 428/131; 428/163;
428/167; 428/169; 428/219; 428/220; 428/417;
428/409
[58] Field of Search .................. 428/119, 120,
428/131, 163, 167, 169, 219, 220, 218,
417, 409; 5/448, 461, 420, 900.5, 901,
902, 481; 297/DIG. 1, 284, DIG. 2, 452.39;
D24/36

[56] References Cited

U.S. PATENT DOCUMENTS

| | | | |
|---|---|---|---|
| D. 303,466 | 9/1989 | Haggerty et al. | D6/503 |
| 2,047,616 | 7/1936 | Church | 155/179 |
| 2,742,957 | 4/1956 | Young | 155/179 |
| 3,293,671 | 12/1966 | Griffin | 156/319 |
| 3,320,108 | 5/1967 | Lande | 152/219 |
| 3,331,089 | 7/1967 | Ornas, Jr. et al. | 5/347 |
| 3,346,042 | 4/1969 | Van Goubergen | 248/22 |
| 3,503,649 | 3/1970 | Johnson | 297/459 |
| 3,681,797 | 8/1972 | Messner | 5/347 |
| 3,990,742 | 11/1976 | Glass et al. | 297/283 |
| 4,383,342 | 5/1983 | Forster | 5/432 |
| 4,403,356 | 9/1983 | Urai | 5/461 |
| 4,967,433 | 11/1990 | Neal | 5/900.5 |
| 4,980,936 | 1/1991 | Frickland et al. | 5/420 |
| 5,136,740 | 8/1992 | Kraft | 5/901 |
| 5,153,956 | 10/1992 | Nold | 5/900.5 |

FOREIGN PATENT DOCUMENTS

| | | | |
|---|---|---|---|
| 438704 | 7/1991 | European Pat. Off. | 5/901 |
| 921098 | 3/1963 | United Kingdom | 5/900.5 |

*Primary Examiner*—Nasser Ahmad
*Attorney, Agent, or Firm*—Birch, Stewart, Kolasch & Birch

[57] ABSTRACT

A load bearing structure with a base and an array of load bearing members, each load bearing member having the general form of a cantilevered beam and made of a resilient material, and having a tip, generally front and back faces, and a bottom, the bottom for interengaging the load bearing member and the load bearing structure. The beam generally increases in thickness from tip to bottom, and both faces are generally planar. The plane of the face and of the back join at an angle $\beta$, and the plane of the back is disposed to the plane of the bottom at an angle $\alpha$.

5 Claims, 8 Drawing Sheets

LOAD BEARING PAD

TECHNICAL FIELD

The invention relates to the field of load cushioning, load distribution and/or absorbing, and vibration dampening structures, surfaces and pads, and to pads and cushions for human use for comfort, health and safety; more particularly to a pad for absorbing and/or distributing the load from, and resiliently supporting, a portion of the human anatomy.

BACKGROUND OF THE INVENTION

Numerous pads and cushions have been developed to address the needs of human health, comfort and safety for sitting or reclining, and for other load supporting purposes. Many of these pads provide other features as well such as insulating the load from the temperature environment beneath the pad.

The problem is that most of the pads and cushions in the art absorb energy relatively uniformly, both over the surface of the pad, and as a function of depression of the pad as it absorbs and supports the load. Thus a pad supporting an anatomical load of a certain weight and shape supports that load in the same way everywhere at once, and the "boney" parts of the human anatomy, especially the ischia, either "bottom out" through the pad, or compress the pad completely, to the relatively harder and less yielding surface beneath, or at best receive no better support than the rest of the anatomy. Pressure studies conducted at Queen Alexander Hospital in Victoria, British Columbia, Canada have shown that the ischia can exert as much as 10 to 15 times the point load pressure on a support surface as the pressure exerted by softer or more spread out structures of the anatomy.

As a corollary proposition therefore, given a support surface of even density and resiliency characteristics, these greater pressure zones will, in effect, experience greater penetration into the surface. Where the surface is otherwise either incapable of sufficient resiliency to absorb the entire point load, or possessed of insufficient thickness so that the load "bottoms out" before full load absorption is achieved, then the residual pressure is instead absorbed by the respective portion of the anatomy. Thus in situations where there musk be long term support, such as for a secretary type chair cushion or a wheel chair to anatomical stress and overuse injuries. This commonplace phenomenon can give rise to pressure sores, particularly in persons who have to spend years at a time in a fixed position, such as wheelchair bound persons, or persons confined to bed. It is known that the primary cause of pressure sores is extended high pressure on tissue causing a lack of blood supply and associated tissue breakdown Known contributing causes further include temperature rise which increases metabolism to already blood starved tissue, and moisture at the skin surface which reduces the tensile strength of otherwise healthy tissue and makes it and the associated tissue even more prone to breakdown.

It is well known that unrelieved high pressure will give rise to sores and eventually to even more serious deep tissue breakdown, and complications thereof, which have been known to go so far as to result in death. In fact, a paper entitled "The Availability And Utilization Of Assistive Technology To Meet The Seating And Mobility Needs Of Severely Disabled And Elderly Persons" published in 1989 by RESNA Press in Washington, D.C. reports that pressure sores have an incidence of one million per year in the severely disabled population, while the average cost for treating a severe pelvic pressure sore is estimated at $30,000. A 1990 RESNA paper reports that some 13,000,000 wheelchairs are in use in the United States, and of that population 6,000,000 could benefit from some form of special seating cushion. In North America, it is reported that 70,000 people die every year from complications associated with pressure sore related illnesses. The total estimated annual medical expense associated with this unfortunate phenomenon exceeds two billion dollars.

What is needed is a load bearing structure or pad that differentially supports such anatomical irregularities to prevent bottoming out while simultaneously providing comfort and freedom from such stress injuries. Such a pad must nonetheless support the entire anatomy in a design load range so that the whole anatomical load is distributed more uniformly over the whole pad, while having the deformation of the pad closely follow natural body contours so that point loads are adequately absorbed by the pad and not by the anatomy. Ideally, at design load, the pad would still have adequate depth under the anatomical projections to accommodate live load shock absorption.

In addition, conventional pad structures either do not provide for, or have inadequate provision for, ventilation and associated moisture sublimation and cooling, nor do they provide much in the way of prevention for sliding around on, and sliding off of, the pad.

DISCLOSURE OF THE INVENTION

Accordingly it is an object of the invention to provide a load bearing structure with sufficient resiliency to absorb an entire point load so that a load on the structure does not "bottom out" before full load absorption is achieved.

It is another object of the invention to provide a load bearing structure that prevents residual pressure from being absorbed by projecting portions of the anatomy such as the ischia.

It is a further object of the invention to provide a load bearing structure which ameliorates or eliminates the problem of pressure sores in chronically seated or recumbent persons.

It is also an object of the invention to provide a load bearing structure to relieve fatigue, soreness, and anatomical deformation which might otherwise lead to anatomical stress and overuse injuries.

It is another object of the invention to provide a load bearing structure that differentially supports anatomical irregularities to prevent bottoming cut while simultaneously providing comfort and freedom from stress injuries.

It is a further object of the invention to provide a load bearing structure to support the entire anatomy in a design load range so that the whole anatomical load is distributed more uniformly over the whole structure, while having the deformation of the structure closely follow natural body contours so that point loads are adequately absorbed by the structure and not by the anatomy.

It is yet another object of the invention to provide a load bearing structure that, at design load, still has adequate depth under the anatomical projections to accommodate live load shock absorption.

It is a further object of the invention to provide a load bearing structure that has adequate provision for moisture sublimation and ventilation.

It is also an object of the invention to provide a pad having a surface interface with the human anatomy such that greater than normal friction occurs between the anatomy and the pad to hold a seated person in place without sliding.

These and other objects of the invention are met by the invention disclosed herein.

In one general form, the invention takes the form of a load bearing structure or pad comprised of individual load bearing members (each also sometimes referred to herein as fins or blades or spines) each projecting from a base plane or base surface at an angle $\alpha$ to the plane of the base surface in rows of individual fins, each fin within each said row separated from one another by some distance. Since the load bearing structure contemplated in the invention is generally resilient and flexible, and is contemplated in at least one instance to be slung in a wheelchair in conventional "hammock" style, references herein to the "base plane" or "plane of the surface", or like reference, refer to the plane of the base of the load bearing structure (and sometimes also to the common bottom plane of the bottoms of the individual load bearing members) when and as if the load bearing structure itself is resting on a flat, planar surface. Each such load bearing member has at least a face, a back, and a bottom, and has a height and a tip at the uppermost region of the height of the load bearing member so that an extension of the plane of the face, or of a plane tangent to the face when the face happens to be curved, and an extension of the plane of the back, or a plane tangent to at least a portion of the back, join at an angle $\beta$, and so that this back plane is disposed to a plane of the base at an angle $\alpha$.

An alternative general embodiment takes the form of a load bearing structure or pad comprised of individual load bearing members each having one or more axes projecting from a base surface at acute angles to the surface of the base, and each load bearing member is comprised of a tip region and a base region, with each region having an average thickness, or an average cross-sectional area, so that the tip region has substantially less thickness or cross-sectional area than the base region, and the tip region is more flexible than the base region. Preferably, each load bearing member has progressively increasing thickness or cross-sectional area from its tip region to its base region. This increase can be either continuous (as will occur in the above most general embodiment where the fin is essentially a wedge with two planar faces), or incremental or discontinuous (as occurs in other embodiments where no single plane defines the entire face or back of a load bearing member). The axes referred to above may or may not be coincident with any particular face or back plane; rather it is contemplated that axes of a load bearing member form and follow the center of mass of the load bearing member from tip to bottom or base through a cross-section of the load bearing member, starting at the point on the bottom or base from which any particular axis is deemed to arise.

A more particular variation of this general embodiment is load bearing structure with a base and an array of load bearing members, where each load bearing member has one or more differently angled axes disposed at angles to the base. Each load bearing member has both a tip region and a base region, and each region has its average thickness. The tip region has substantially less thickness than the base region, with the tip region being flexible relative to said base region. This variation will generally have irregular and non-wedge or fin like shapes, such as tapering crescent shaped members that also taper from base to tip. Such a crescent shaped member would have axes slanted generally toward the opening of the crescent at various angles with respect to a plane of the base, as well as slanted from the sides in some cases toward the crescent center, or focus.

Each load bearing member is comprised of resilient material generally of the rubber-like polymeric compounds such as polyurethanes or other elastomers. The load bearing members may take the form of wedges, or columnar studs with angular truncations at their tops, or a combination of these shapes, such as a generally rectangular solid block with an angular truncation at its tip, or a trapezoidal solid with such a truncation. Other less regular shapes are contemplated as well, and for some purposes will better suit the design of the pad. The load bearing members of the invention will generally have the form and characteristics of a cantilevered beam.

A typical load bearing structure or pad has a base and a plurality of such load bearing members, or fins, with the load bearing members spaced and arranged in such a way, and with their faces at such angles to the surface, that a load is spread across the plurality of load bearing members, and each load bearing member individually responds to and absorbs part of the load by displacing the tip toward the surface and bending and deflecting the face in an arc toward the fin behind it; that is, rearwardly with respect to the particular load bearing member. Because the thickness or cross-sectional area of the load bearing member increases generally from tip to base, it is believed that as the tip is displaced toward the base surface, the energy absorbed by the load bearing member per incremental degree of displacement increases, as does the plan area and contact area of each load bearing member (where "plan area" of a fin means the area as measured horizontally in a "plan view" of the surface from which the load bearing members project, and "contact area" means the area or the load bearing member in contact with the load).

Depending on the angles $\alpha$ and $\beta$ selected, the spacing of the load bearing members, the length of the load bearing members, the thickness of the base, and the density and resiliency of the material from which the load bearing members are made, such a pad can have widely variable response to a given load, and a variety of pads can be constructed to suit all possible anatomical weight and shape configurations. The ideal is that as load increases, so does the aggregate plan area or contact area (or both) of the load bearing members, with best results contemplated when the ratio of load increase to plan area increase approaches unity. For instance, by altering the base or the load bearing elements as above described and/or the durometer of the resilient material, the load bearing structure can be "tuned" to perform to a specific range of design load, and each element can be designed to bend so that its supporting area, or contact area, increases with load in a more or less linear fashion. One advantage of this tuning is that the corresponding return pressure of the pad upon the loading anatomy remains relatively constant as the load increases.

In a further alternative embodiment, an elastic load bearing member for use in a load bearing structure also has the general form of a cantilevered beam. The beam is also comprised of a resilient material and has a tip, generally front and back faces, and a bottom. The bottom may be an actual surface or structure at the end of the load bearing member furthest from the tip, or it may serve merely as a conceptual reference point, as when the load bearing member and load bearing structure are integrally interengaged. As in the other embodiments, the beam generally increases in thickness from the tip to the bottom.

A variation on this embodiment has at least one of its faces generally in the form of a folded plane, instead of both faces being generally flat single planar surfaces. That is, one or both of the front and back faces are "faceted" into plane segments. The angles of the several plane segments in this folded plane surface are selected so as to both generally increase the thickness or cross-section of the beam or fin from tip to bottom, and to form various obtuse dihedral angles with one another. Angles and dimensions are selected to optimize flexion characteristics of the beam, so that progressively increased bending or displacement absorbs progressively increasing amounts of load per incremental displacement, resulting in what is believed to be a more linearly behaving bending or displacement response, and avoiding at least one difficulty of the relatively simpler plain wedge member embodiment in that its relatively thinner tip region is so flexible that it absorbs almost no load for much significant initial displacement.

In yet another variation of this cantilevered beam embodiment, the bottom is further comprised of a pedestal-like structure. The pedestal has a tunnel or void running substantially, and preferably all the way through, the width of the load bearing member so that the void divides the pedestal generally into front and back legs, with the back leg generally having less thickness than the front leg. The pedestal and void are both preferably generally triangular in cross-section. The relatively thinner back leg is thus collapsible when a design load range is exceeded, preferably by 10% or more. This gives this embodiment an additional advantage over the more basic embodiments disclosed above, in that while they all provide for optimum load absorption and resiliency up to any given design load range, and continued potential past the range for live load shock absorption, they all require greater and greater pressures or loads past design load range to achieve further displacement. In the instance of either relatively heavier persons and/or persons with relatively more pronounce anatomical projections, pressure back on the ischia or like protuberances can be extreme. By absorbing load with increasing resistance right up to maximum design load, this embodiment meets the invention requirements for progressively increasing load absorption. Then when the full weight of the load or person is settled, the extra pressure of the projections beyond design load range causes the pedestal back legs of those fins immediately beneath the projections to resiliently collapse to selectively and dramatically release and relieve the pressure on those anatomical points, and thereafter, at least until the load itself is relieved or released, to support the anatomical load at a significantly lower pressure, without affecting the load absorbing characteristics of the rest of the load bearing structure.

With particular regard to a pad for supporting a portion of the human anatomy, the invention is particularly well adapted for both supporting the overall load and cushioning human anatomical irregularities, such as the ischia. That is, the pad of the invention can separately deform and absorb energy at so called point loads, while still evenly distributing the overall load across the pad, and at the same time provide a previously unattainable level of comfort because of its individual handling of the anatomical projections giving rise to the point loads.

A particular seat pad embodiment of the invention is comprised of a base and an array of load bearing members, each load bearing member comprising: a face, a back, and a bottom, and having a height and a tip at an uppermost region of said height, wherein a plane of said face and of said back join at an angle $\beta$, and said back is disposed to the plane of said base at an angle $\alpha$. This embodiment preferably has holes or apertures in a central region of the base for allowing fluids such as incontinent waste discharges to pass through the seat pad to some catch or collection means below the pad, thereby preserving the seated person in relative dry comfort and hygienic condition. The embodiment also has a means for attaching the pad to a conventional wheelchair frame in place of conventional hammock-style slung seat. In preferred embodiments the connecting means is a series of holes or apertures disposed along opposing edges of the pad.

In addition, the pad of the invention also allows for air circulation and moisture sublimation for additional hygienic and comfort characteristics. In conjunction with the chair pad aspect of the invention, a cover cloth is contemplated having a relatively "slippery" backing in contact with the load bearing members, and a more tactile surface in contact with the anatomy. This type of cover cloth, in addition to the usual benefits of such a cover, cooperates with the bending and deflecting movements of the load bearing members so that the cloth does not hinder such movements, and so that the load bearing members in their movements do not impart any appreciable shear forces on the cloth. The cloth cover thereby is minimized in its interference with the load absorbing function of the structure and in particular with the deflection and displacement characteristics of the individual load bearing members.

It is contemplated that in addition to a chair pad, the invention can also be employed as footwear inner soles, as full body mattress, as work surface for standing, or as support surface for vibrating machinery, or the like.

BEST MODE OF CARRYING OUT THE INVENTION

Preferred embodiments of the invention may best be understood by reference to the drawings, wherein like numbers indicate like parts.

Preferred embodiments of the invention comprise a load bearing structure, sometimes referred to herein as a cushion or pad, that is, in the main, injection molded from an elastomeric rubber-like material without encapsulated or entrained air. Preferred materials are all high performance polyurethanes, generally supplied to the inventor as the conventional two part heat cured liquid. Casting or molding gives the finished pad a smooth and non-porous skin, providing an inert and easily cleaned surface. Preferred materials have a tensile strength in the range of 3500 psi with an elongation of 530% at break, and with high flexibility, resilient memory and rebound. The preferred material is soluble only with aromatic or chlorinated hydrocarbons and is not affected by common cleaning and sterilizing agents. It is also undamaged by temperatures from −70 to +250 degrees Fahrenheit.

Figure 1:
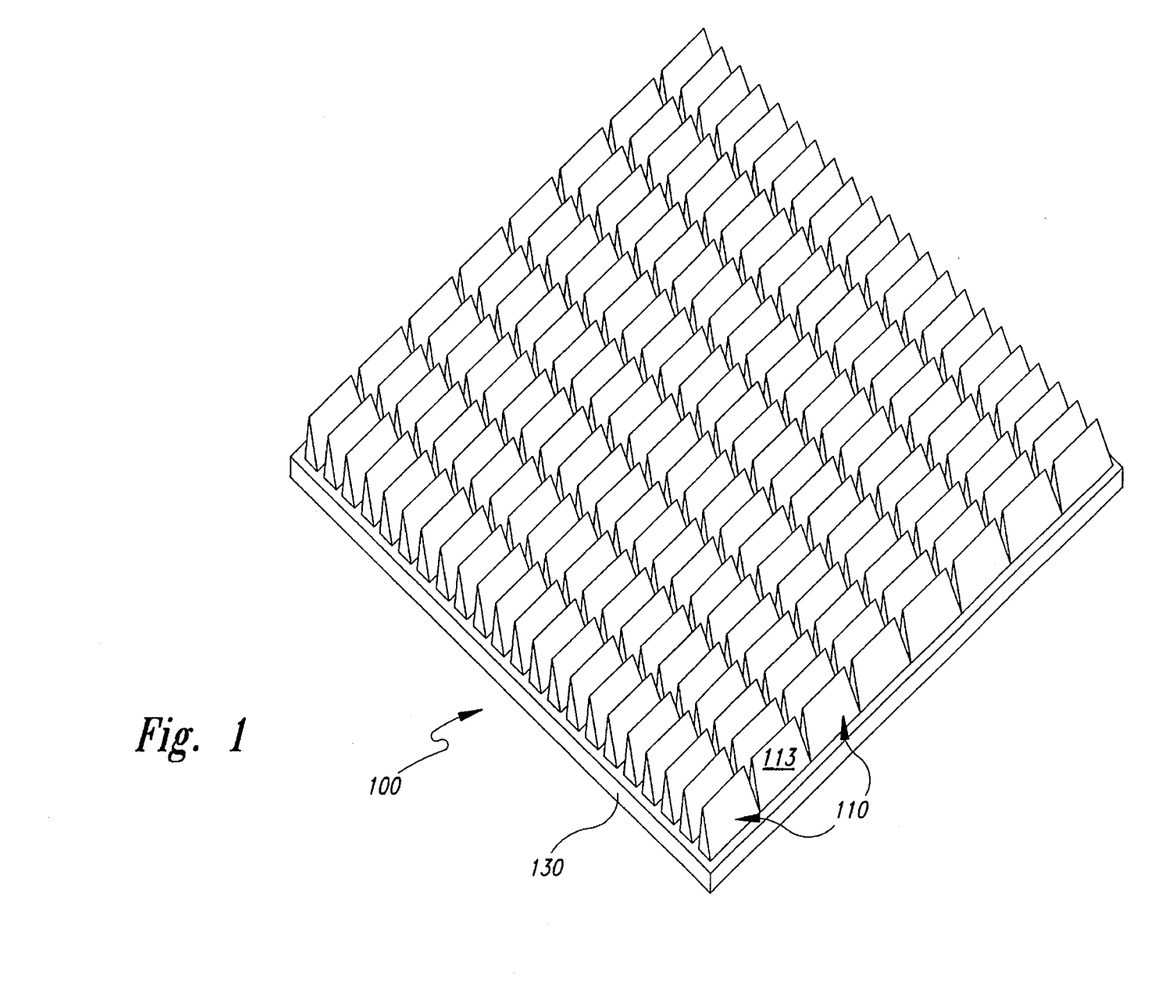
FIG. 1 is an isometric view of one general embodiment of the invention.
Figure 4:
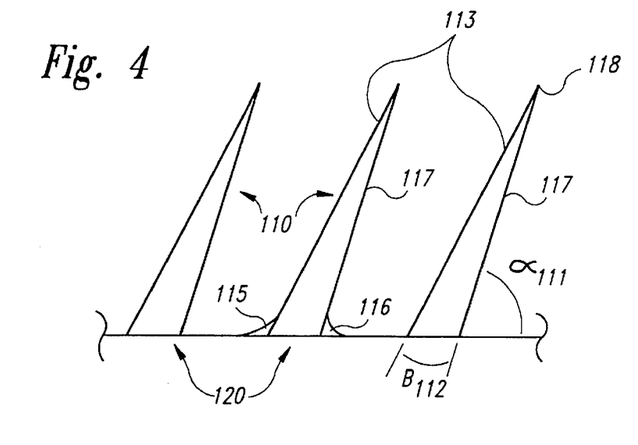
FIG. 4 is a partial side elevation of the invention shown in FIG. 1.

In FIGS. 1 and 4 the load bearing structure 100 of the invention may be seen in the form of a pad with parallel array of individual load bearing members 110, also referred to herein as fins or beams, each fin having a face 113, a back 117, a tip 118, and bottom 120. One preferred pad prototype employs 126 one inch wide fins in a pad 18 inches wide by 16 inches from front to back. Each fin is preferably separated side-by-side by a distance sufficient to insure fully independent response to load by each fin without interference from the fins to either side. In typical preferred parallel arrays, fins are spaced front to rear by a distance that is two-thirds the average height of fins. However this spacing may be varied and even non-uniform, and indeed the array may be non-parallel as well, all as illustrated schematically in FIG. 10. Preferred load bearing members are believed to be functionally upstanding cantilevered beams in mechanical terms, at least when the fin is affixed to or integral to the pad base for support at one end of the beam.

Figure 5A:
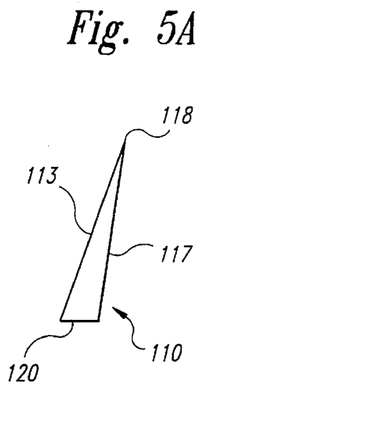
FIG. 5A is a side elevation of a single load bearing member from the invention of FIG. 1.
Figure 5B:
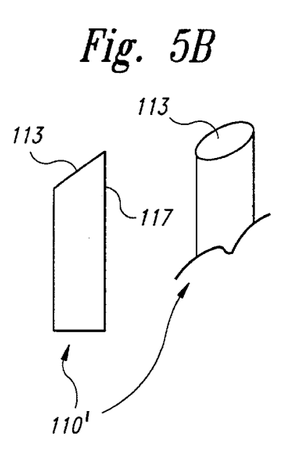
FIG. 5B is a combined side elevation and partial isometric view of an alternate configuration to FIG. 5A.
Figure 5C:
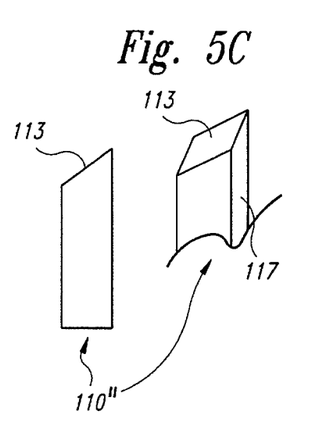
FIG. 5C is a combined side elevation and partial isometric view of an alternate configuration to FIG. 5A.
Figure 5D:
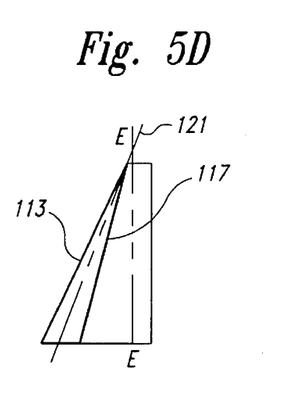
FIG. 5D–E–F is a combined rear elevation section, side elevation section, and plan view, respectively, of an alternate configuration to FIG. 5A.
Figure 5E:
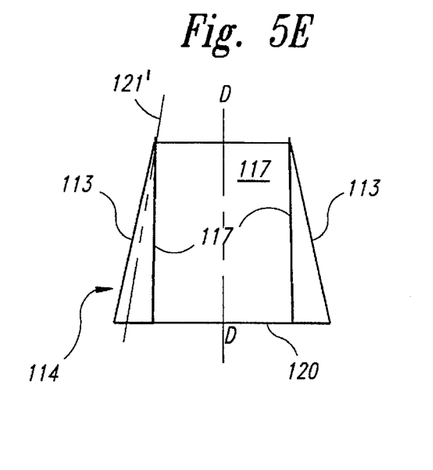
Figure 5F:
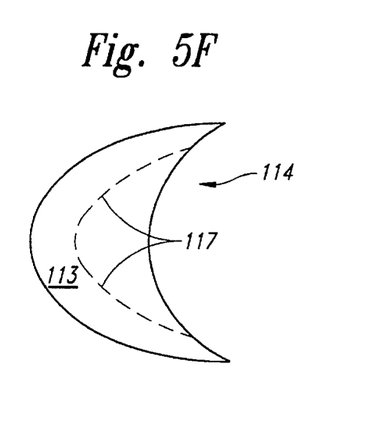

In some preferred embodiments, fin 110 is wedge shaped as illustrated in FIGS. 1 and 5A; however other beam shapes are also contemplated, such as a diagonally truncated cylinder 110' and a diagonally truncated parallelogram 110" illustrated in FIGS. 5B and 5C. These and other beam shapes, including irregularly shaped fins, and load bearing members with crescent shaped cross-sections such as illustrated in FIGS. 5D–E–F, may be devised to facilitate specially adapted alternate embodiments of the invention. Flexion and other bending characteristics of the fins or beams 110 of the invention are dependent, as described elsewhere above, on formulation and composition of the elastomeric substance from which they are molded, and on dimensional characteristics such as cross-sectional thickness, height, shape, and angular relationship to the base 130. This angular relationship has been generally specified above in terms of defined angles $\alpha$ and $\beta$. Irregular shaped members such as the crescent shape 114 however do not readily lend themselves to description in this regard by reference to single angle values. Thus for this shape and generally for all shapes, it is also useful to conceive of each beam shape as having one or more angular vertical axes 121. Any particular axis will generally follow the center of mass in a line lying in a plane perpendicular to the base 130 as integral cross-sectional layers of the shape are coursed from bottom 120 to tip 118. Such angular lines or axes will generally all slant either rearwardly (as does axis 121 in FIG. 5D), or inwardly (as does axis 121' in FIG. 5E) in the case of the crescent shape member 114, or both.

Figure 3:
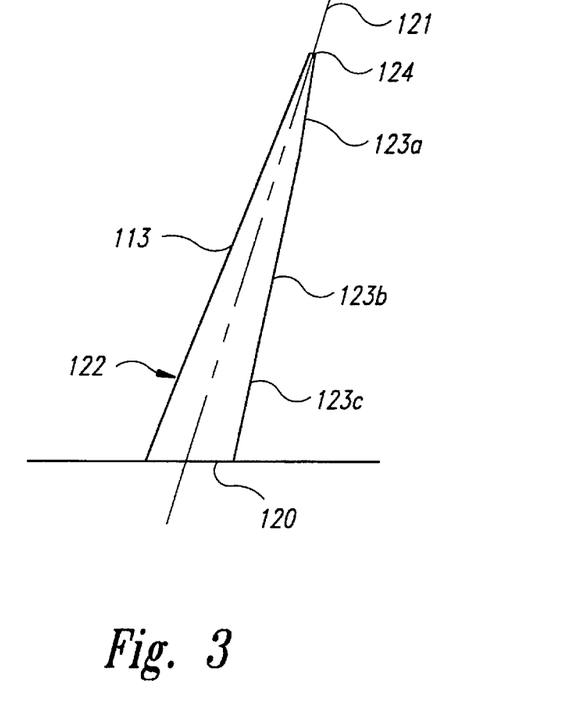
FIG. 3 is a schematic cross-sectional view of an alternative embodiment with one folded plane face.

FIG. 3 is a schematic illustration of another preferred embodiment of the invention, which is referred to herein as a "folded plane" type load bearing member, or faceted fin 122. It is so called because of the plane segments or facets 123a, 123b, and 123c which make up the folded back face 123 of fin 122. It is contemplated that each individual plane segment or facet is substantially planar, though not necessarily coplanar with each other. It is also contemplated that the number of facets may be varied to suit design requirements. In common with other fin type embodiments, fin 122 has front face 113, and bottom 120. Tip 124 differs however in having discernable thickness, preferably 0.030 inches or so. Fin 122 also has axis 121 more or less vertically bisecting its mass, as further discussed elsewhere herein. It is contemplated that faceted fin 122 will respond to load more favorably under some circumstances than simple wedge type fins of other embodiments. It is believed that faceted fin 122 will absorb more initial load with less initial bending or deflection, thus to achieve a more linear response in the load/displacement curve of FIG. 7. A preferred embodiment of fin 122 is 3 inches from bottom to tip measured along face 113, and each plane segment or facet 123a,b,c is approximately 1 inch measured in the same direction. Fin 122 preferably has the following thickness dimensions: at 1 inch from the tip, 0.19 inches; at two inches from the tip, 0.21 inches; and at the bottom, 0.25 inches. Front face 113 is preferably disposed at 78 degrees to the plane of bottom 120, though other angles may be substituted to meet design requirements as discussed elsewhere herein.

In preferred embodiments, the array of fins 110 in pad 100 is parallel and evenly spaced. However it is contemplated that specialized uses of pad 100 will be better served by non-parallel and irregularly spaced arrays of load bearing members, and by arrays of load bearing members employing more than one shape of member. Embodiments are also contemplated wherein the angle $\alpha$ 111 is not the same for all fins in the pad. It is believed that relatively straighter (ie closer to 90 degrees) fins are stiffer and less yielding, and therefore more appropriate in specialized pads designed for particular anatomical configurations where positioning of greatest point loads can be predicted in advance with some precision so that stiffer fins can be employed at the sites of such anticipated greater point loads. One embodiment is contemplated wherein a base is designed to accept different modular fin groupings so that a given pad may be customized or optimized for different predicted load configurations. Alternatively, a pad may be comprised of puzzle-like interlocking modules to this same end. While preferred embodiments will employ a planar base structure for pad 100 (that is, the pad when in a "normal" or resting or unslung position will have a substantially planar base), some specialized embodiments are contemplated employing a contoured or molded base structure (such as with regular, same height wedges), or a planar base with tip heights contoured.

FIG. 4 also illustrates preferred angular relationships of the load bearing members. Fins 110 have front face 113 and back face 117 joined at tip 118 at an angle $\beta$ 112, and each fin 110 is slanted backwardly with respect to each other and with respect to the plane of bottom 120 at an angle $\alpha$ 111. Optionally, each fin may have a face fillet 115 and a back fillet 116. Each slanted fin preferably has the same tip height. It will be appreciated that bottom 120 is generally a conceptual reference point, and not usually an actual plane surface. When fins 110 are affixed or integral to pad base 130, it is the upper, relatively planar surface of base 130 which defines bottom 120. However, as the individual fins, wedges, and the like 110 of the invention are regarded as distinct from their embodiment in pad form, bottom 120 may generally be taken as the plane at which the fin 110 is joined, or joinable, to pad base 130.

It is contemplated that many different angles of α 111 may be used in the invention, including 90 degree angles. It is believed however that best results are obtained when α 111 has a value within the range of 70 to 80 degrees, with an angle of 70 degrees presently preferred. As larger values of α are employed, smaller initial contact areas are created and the rate at which contact area increases under load also increases, making the spring effect of each load bearing member "softer", where "softer" in this sense means more yielding and less invasive to the anatomical load body itself. It is not yet clear whether an increase in plan or contact area is part of the mechanism of load absorption or distribution, or merely an effect of such absorption or distribution by the load bearing system. However, increased contact area or plan area does tend to decrease at least the perceived or subjective pressure on the anatomy by the pad. In the same vein, many different angles of β 112 may be employed to make thinner or thicker wedge shaped fins 110, but it is believed that best results will obtain with angles in the range 7.5 to 15 degrees, with an angle β 112 of 10 degrees presently preferred.

Figure 8:
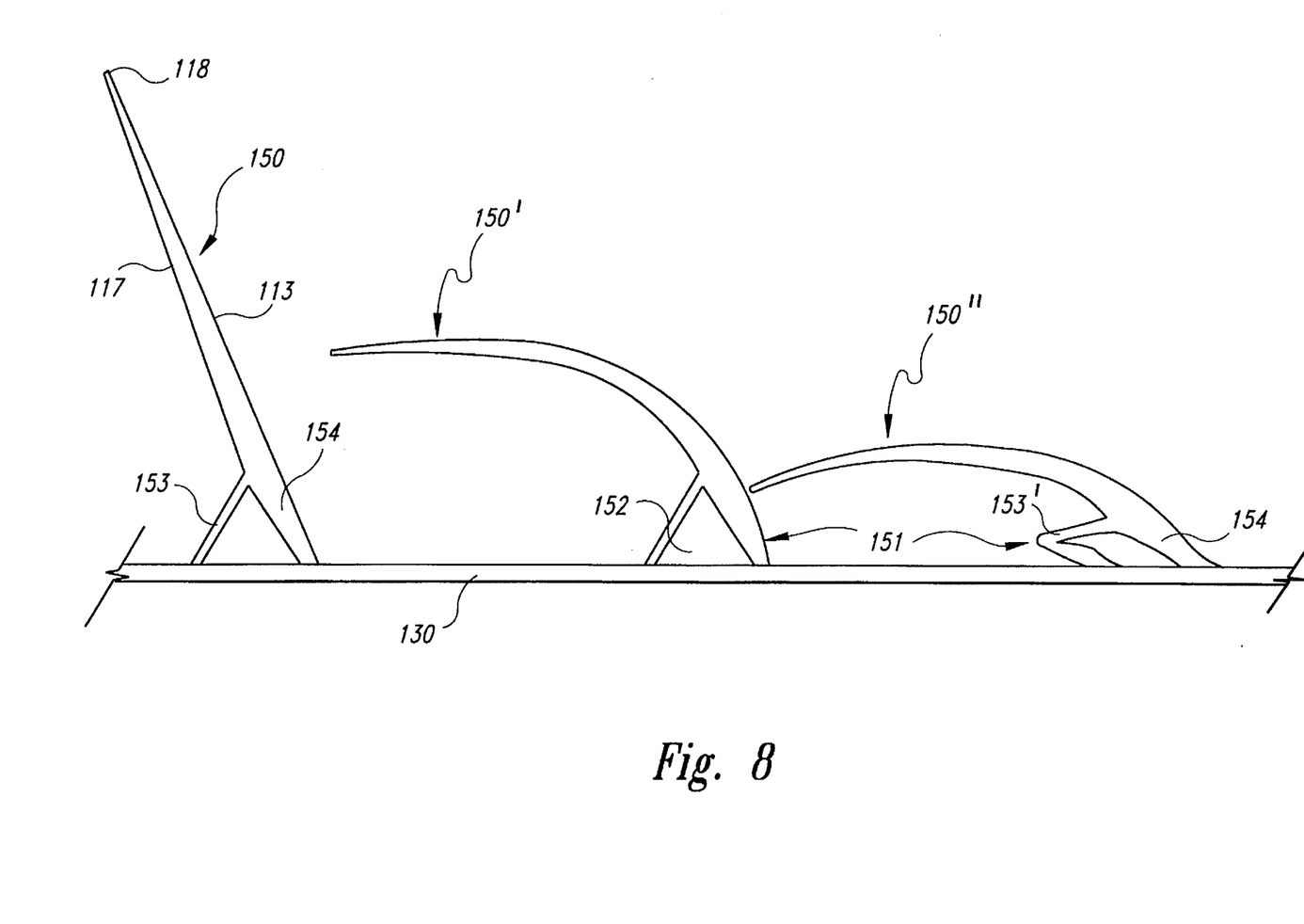
FIG. 8 is a multiple schematic cross-sectional view of an alternative embodiment with collapsible pedestal structure.

FIG. 8 illustrates a pedestal based fin 150 which is a variation of the cantilevered beam fin 110 of the invention. At the bottom of fin 150 is a pedestal 151 affixed to base 130. Pedestal 151 has a tunnel or void 152 running substantially, and preferably all the way through, the width of fin 150 so that void 152 divides pedestal 151 generally into a front leg 154 and a back leg 153, with back leg 153 generally having less thickness than front leg 154. Fin 150 has angular characteristics and tip 118, front face 113 and back face 117, in common with other fin embodiments discussed herein, though the pedestal design is not limited to relatively simple fin profiles, but may for example be combined with fin 122, or other more complex fin profiles. The pedestal and void are both preferably generally triangular in cross-section, and preferably equilaterally so. The relatively thinner back leg is intended to collapse when a design load range is exceeded, preferably by 10% or more. The three fins 150, 150', and 150" in FIG. 8 illustrate progressive load increase on fin 150 with corresponding increased displacement and deflection in fins 150" and 150". When the full weight of the load or person is settled, as upon fin 150", the extra pressure of the projections beyond design load range causes pedestal back leg 153' of fin 150" immediately beneath the projections to resiliently collapse to release and relieve the pressure on those anatomical points, without complete or total collapse of fin 150".

In preferred embodiments to date, base 130 and load bearing members 110, 122, and 150 are integrally cast or molded from polyurethane in a manner well known in the art. The process is the conventional one of male or positive "master" creation, followed by female or negative mold creation, followed by pour molding or injection molding depending of production facilities available and upon desired output. The base has a preferred thickness in the range of 0.10 to 0.25 inches, with thicker bases providing relatively more rigid structures due to the interaction of the load bearing members with the base. The presently preferred polyurethane is ADIPRENE® brand polyurethane from Uniroyal, formula L-100. Other polyurethane formulas and compositions well serve however, as will be appreciated by those skilled in the art, and formulae and even different materials will be developed in the art which may even better serve the objectives of the invention without departing from the scope of the invention as claimed herein. The thickness of the base is believed to affect the relative spring-like characteristics of otherwise identical load bearing member configurations. A thicker base tends to produce stiffer fins, compared to the performance of the same fins on thinner bases.

Figure 6:
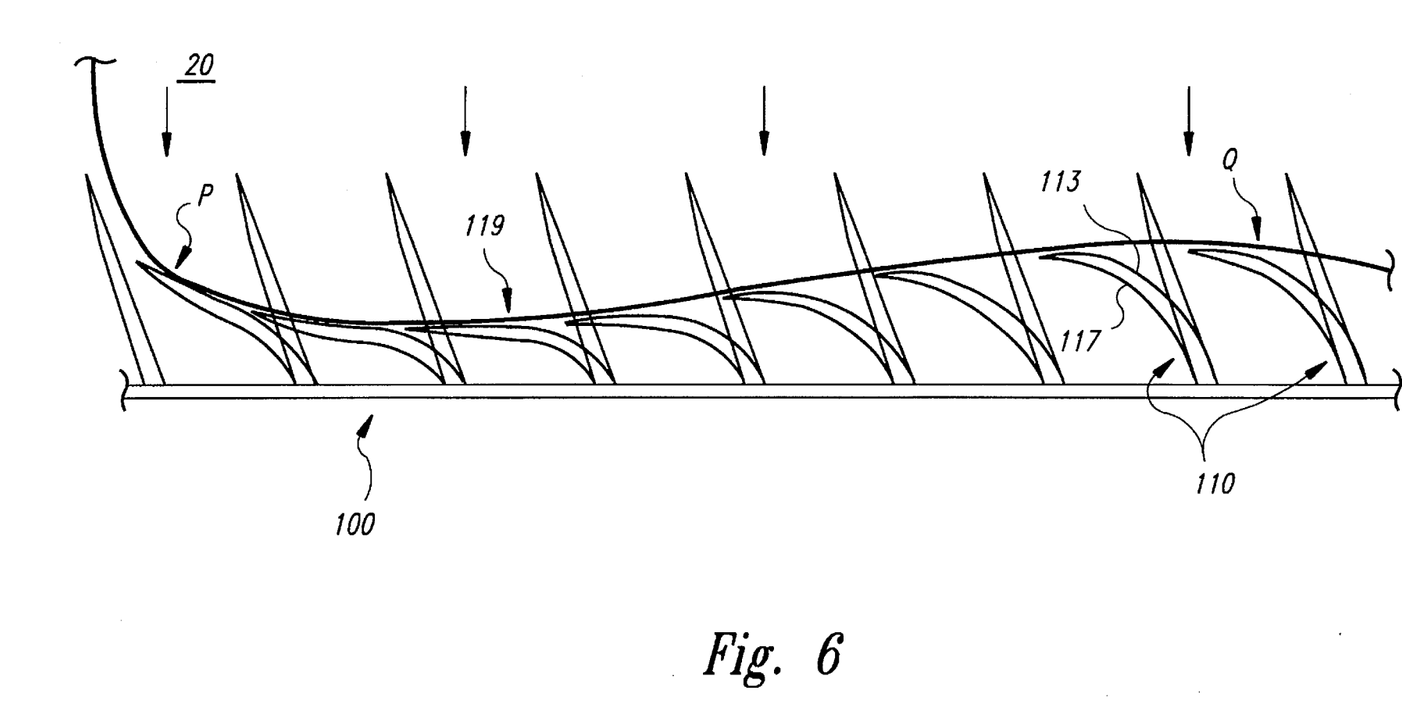
FIG. 6 is a cross-section of a portion of the invention of FIG. 1 illustrating displacement and deflection of the load bearing members under anatomical load.

In FIG. 6, fins 110 of pad 100 are schematically illustrated in load absorbing displacement and deflection under anatomical load 20. The nature of the differential displacement and deflection of the individual fins when accommodating an irregular or anatomical load is illustrated. Fins under the greatest point load will be displaced and deflected the furthest to their maximum displacement and deflection where they come into contact with the fins to their respective rears. Other less loaded fins will have less displacement and deflection.

Figure 2:
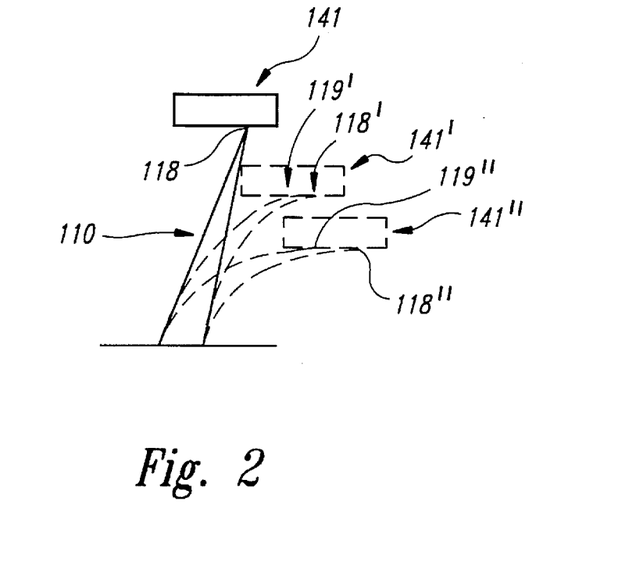
FIG. 2 is a schematic cross-sectional representation of the functioning of a portion of the invention shown in FIG. 1.

This phenomenon is further illustrated in FIG. 2 which schematically shows for a typical fin the effect of a test load 141 on displacement and deflection. As test load 141 descends (or as the weight of load 141 increases) to the positions indicated by 141' and 141", fin 110 progressively absorbs the load and tip 118 deflects to the positions indicated by 118' and 118" to present load bearing area segments 119' and 119" of increasing contact area to load 141. A flat test load is chosen for this illustration to simplify the discussion of load bearing area and its relationship to load, because a flat test load produces correspondingly flat load bearing area segments. In practice, live loads are seldom flat, or at least not often flat over any appreciable area, and fully loaded deflectors may be better illustrated in FIG. 6.

As shown in FIG. 6, when anatomical load 20 is fully rested on load bearing members 110 (or in other words when load 20 is in the design load range, which is defined as that theoretical load per unit area that will cause full displacement and deflection of the fins and cause them to touch one another, but not touch the base), the fins are deflected rearwardly so that the tip of one lays upon the face of the fin to its immediate rear; thus to form, as it were, a continuous load bearing or contact area 119 comprised of many individual load bearing area fin segments 119', such as the area represented schematically by the line 119 between points P and Q in FIG. 6. It will be appreciated that even though not all fins are fully deflected to touch their rearward mates, at the load point at which appreciable numbers of fins are so deflected, and the pad 100 has absorbed the load 20 fully, the line P-Q represent the nominal load bearing area or contact area, even though portions of the anatomy are not actually in contact with a fin 110.

Figure 7:
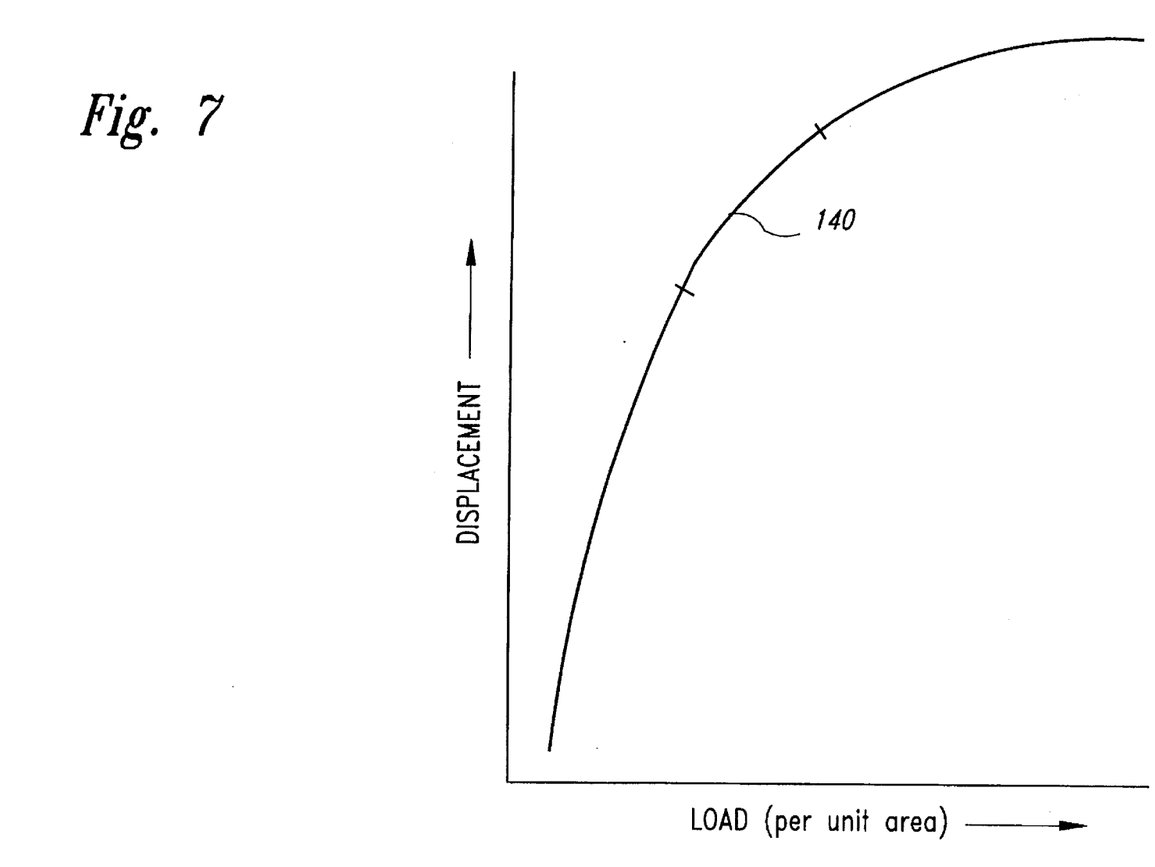
FIG. 7 is a graph of displacement as a function of applied load with design load range noted schematically.

FIGS. 7 graphically illustrates the qualitative relationship believed to exist between displacement of a load bearing member and increased load. As load increases to the "design load range", meaning the range of load (per member) within which the member is designed to have optimum response to load, displacement increases in an approximately linear fashion. As the design load range 140 is reached and passed, still further increases in load produce relatively little further increase in displacement.

Figure 9:
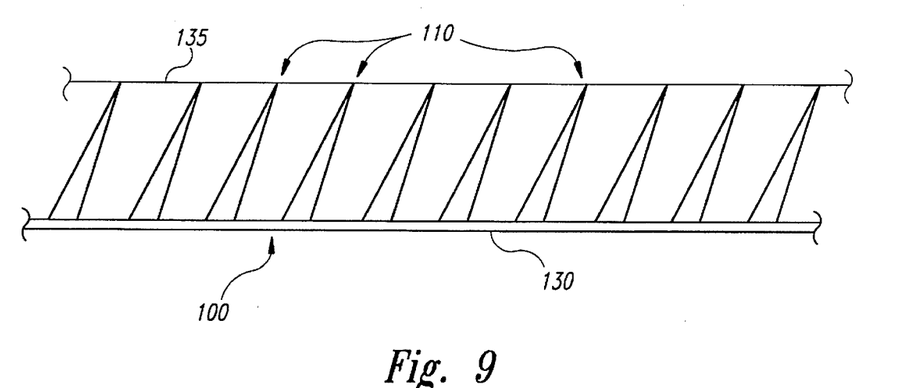
FIG. 9 is a partial schematic side elevation of another embodiment of the invention.
Figure 10:
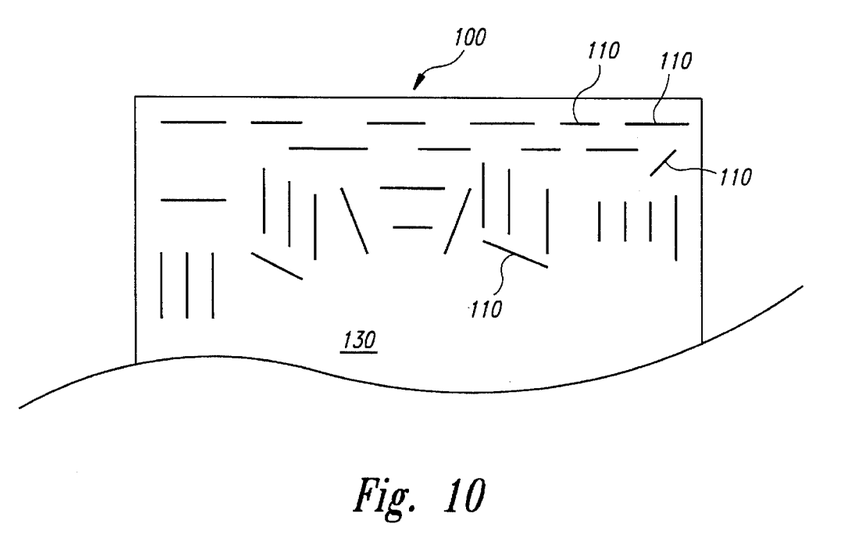
FIG. 10 is a partial schematic plan view of another embodiment of the invention.

In FIG. 10 a further alternate embodiment is illustrated schematically. The fins 110 are shown with varied and non-uniform spacing both front to back and side to side, and the array is also shown as non-parallel. In FIG. 9 a variation employing fins or wedges 110 of non-uniform thickness and non-uniform angles β, that are attached to base 130 at non-uniform angles α is shown. Either or both of these variations are contemplated as being employed in special load absorbing situations where a pad may be more or less customized by design to have stiffer or otherwise greater load absorbing characteristics in some regions of the pad as opposed to less stiffness or more anatomical conformity in other pad regions. It is contemplated that this customization could occur at the molding level of pad construction by designing the appropriate mold, or it could occur at the pad user's level by providing the user with a pad base designed to receive modular wedges or fins that interlock and attach to each other and to the base to allow build up of the desired load absorbing design to suit the particular user.

Figure 11:
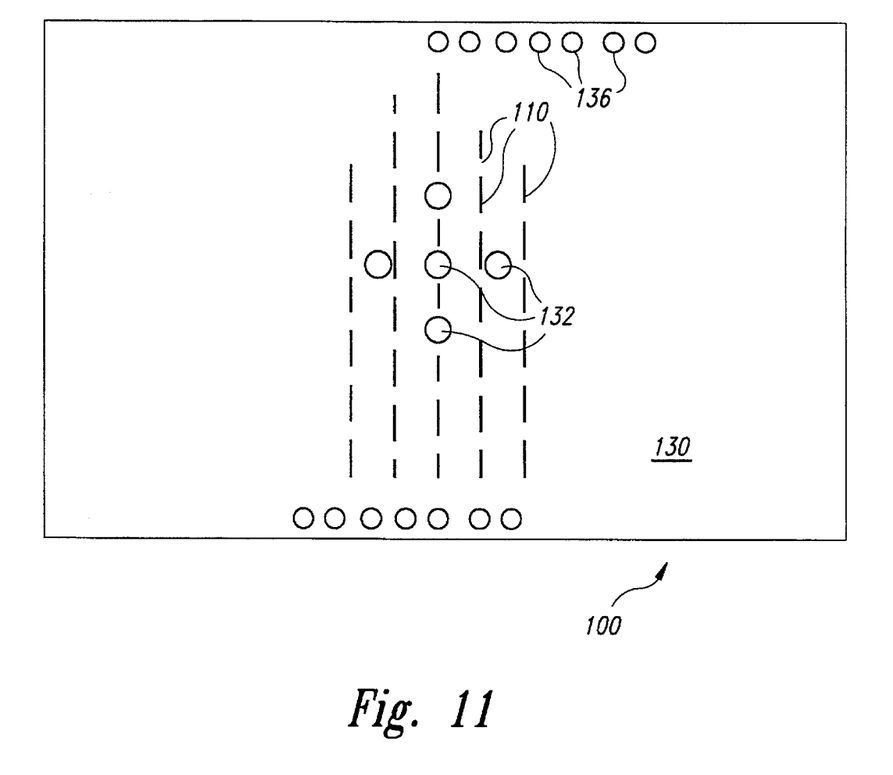
FIG. 11 is a partial schematic plan view of still another embodiment of the invention.

FIG. 11 is a partial schematic illustration of a particular seat pad embodiment of the invention. Pad 100 has base 130 and an array of fins 110 much like the general embodiment of FIG. 1. In addition it has centrally located drain apertures 132 for allowing passage of fluids through to a collection means positioned below the apertures. Pad 100 also has edge located connecting means such as connecting apertures 136 on opposing edges of the pad with which to connect the pad to a support structure such as a wheel chair frame (not shown). Pad 100 may also have a pad cover 135 (illustrated schematically in FIG. 9) made of some material which has a relatively "toothy" or tactile high friction outer surface, and a low friction or slippery inner surface. The friction of the outer surface thereby helps to keep the seated person in place, while the slippery inner surface cooperates with the fins 110 by not interfering with their deflection and displacement during load absorption.

In compliance with the statute, the invention has been described in language more or less specific as to structural features illustrated. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

INDUSTRIAL APPLICABILITY

This invention will find use in the many industries, particularly in the industries associated with providing load absorbing and vibration dampening surfaces and in the rehabilitative seating or wheelchair industries. The invention is commercially superior to existing apparatus and methods because it employs hygienic, resilient load bearing members that for instance can reduce the incidence of pressure sores. Most of the components of the system will be inexpensive and readily available throughout the world.

I claim:

1. An elastic load bearing member for use in a load bearing structure, said load bearing member having the form of a cantilevered beam, said beam being comprised of a resilient material and having a tip, generally front and back faces, and a bottom, said bottom for interengaging said load bearing member and said load bearing structure; wherein said beam generally increases in thickness from said tip to said bottom, and wherein said bottom is further comprised of a pedestal, said pedestal having a void running substantially the width of said load bearing member, said void dividing pedestal generally into front and back legs.

2. The apparatus of claim 1 wherein said back leg is collapsible when a design load range is exceeded.

3. The apparatus of claim 2 wherein said back leg collapses when said design load range is exceeded by 10% or more.

4. The apparatus of claim 1 wherein said void is formed so that said back leg has generally less thickness than said front leg.

5. The apparatus of claim 4 wherein said pedestal and said void are generally triangular in cross-section.

* * * * *

UNITED STATES PATENT AND TRADEMARK OFFICE
CERTIFICATE OF CORRECTION

PATENT NO. : 5,494,725
DATED : February 27, 1996
INVENTOR(S) : Mark Fejes

It is certified that error appears in the above-indentified patent and that said Letters Patent is hereby corrected as shown below:

In column 12, line 13 of the Patent, reading --beating-- should read "bearing".

In column 12, line 23 of the Patent, insert --said-- before "pedestal" to read "dividing said pedestal".

Signed and Sealed this

Twenty-fifth Day of June, 1996

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,494,725
DATED : February 27, 1996
INVENTOR(S) : Mark Fejes

It is certified that error appears in the above-indentified patent and that said Letters Patent is hereby corrected as shown below:

On the title page item [73], delete "Nippon Steel Corporation, Tokyo, Japan".

Title page item [56], Attorney, Agent, or Firm should read
— Patrick Michael Dwyer--

Signed and Sealed this

First Day of October, 1996

*Attest:*

BRUCE LEHMAN

*Attesting Officer*      *Commissioner of Patents and Trademarks*